United States Patent [19]
Bai et al.

[11] Patent Number: 6,020,844
[45] Date of Patent: Feb. 1, 2000

[54] CAR ON-BOARD RADAR AXIS ADJUSTING METHOD

[75] Inventors: Jie Bai; Mitsuru Nakamura; Kazuhiko Hanawa, all of Hitachinaka; Tatsuhiko Monji, Ibaraki-ken; Kazuaki Takano, Mito; Noriharu Sato, Tokyo, all of Japan

[73] Assignees: Hitachi, Ltd.; Hitachi Car Engineering Co., Ltd., both of Japan

[21] Appl. No.: 09/225,475

[22] Filed: Jan. 6, 1999

[30] Foreign Application Priority Data

Jan. 6, 1998 [JP] Japan .................................. 10-001099

[51] Int. Cl.⁷ ...................................................... G01S 7/40
[52] U.S. Cl. .......................... 342/165; 342/174; 342/167; 342/75; 342/147
[58] Field of Search ................................ 342/70, 71, 72, 342/73, 74, 75, 77, 147, 149, 153, 165, 167, 173, 174

[56] References Cited

U.S. PATENT DOCUMENTS

| | | | |
|---|---|---|---|
| 3,921,173 | 11/1975 | Thomson | 342/92 |
| 4,101,888 | 7/1978 | Heller et al. | 342/111 |
| 4,818,999 | 4/1989 | Kobayashi et al. | 342/59 |
| 5,402,129 | 3/1995 | Gellner et al. | 342/70 |
| 5,471,214 | 11/1995 | Faibish et al. | 342/70 |
| 5,530,447 | 6/1996 | Henderson et al. | 342/70 |
| 5,751,240 | 5/1998 | Fujita et al. | 342/70 |

FOREIGN PATENT DOCUMENTS 7-81490 of 0000 Japan .
59042410 3/1989 Japan .

Primary Examiner—John B. Sotomayor
Attorney, Agent, or Firm—Evenson, McKeown, Edwards & Lenahan, P.L.L.C.

[57] ABSTRACT

In a method of adjusting the axis of a car on-board radar, especially, a car on-board mono-pulse radar having the function of transmitting radio waves, light or ultrasonic waves, a car axis and an offset axis are set and the mount angle of an antenna offset-mounted on the offset axis can be adjusted with high precision and with ease through a reduced number of process steps. In the method, at least two points are set on the car, at least two isosceles triangles having a common base defined by a line connecting the setting points and sides of different lengths are drawn, a line connecting vertexes on the same plane of the obtained isosceles triangles and an extension of that line are determined as the car axis, the radar antenna is mounted on the car at an offset position which is apart from the car axis by a constant distance in the horizontal direction, a straight line parallel to the car axis and passing through the offset position is determined as the offset axis, a reflector is disposed in a direction at a constant azimuth angle as viewed from the offset position of the antenna, and the reflector is used as a detection target of the radar to adjust the mount angle of the radar antenna such that an azimuth angle detection value of the reflector detected by the radar equals a setting value of the azimuth angle.

7 Claims, 13 Drawing Sheets

TWO POINTS ARE SYMMETRICAL TO LONGITUDINAL AXIS OF CAR

CAR ON-BOARD RADAR AXIS ADJUSTING METHOD

BACKGROUND OF THE INVENTION

The present invention relates to a method of adjusting the axis of a car on-board radar, for example, used in a collision alarming system which measures a relative speed and a headway between a car of interest and an obstacle such as a preceding car by transmitting/receiving, for example, a radio wave, light or ultrasonic waves so as to inform a driver of approach to the obstacle and more particularly, to a car on-board radar axis adjusting method which, in a radar having an antenna mounted at a position offset from the longitudinal axis of a car (hereinafter simply referred to as a car axis), can perform the offset mount of the antenna with high precision and can perform the adjustment of mount angle of the antenna with ease.

In recent years, a millimeter wave radar serving as a headway measuring means of a headway alarming system has been studied and developed with the aim of preventing vehicle accidents. Generally, the directivity of transmitting axis of the antenna serving as a transmitting/receiving unit of the headway alarming system is considered as the fundamental condition for accuracy of radar measurement and stringent directivity is required. Accordingly, in a conventional antenna mounting method, when an electric field strength measuring unit of millimeter wave radar is mounted to the front of a car, the mount angle of an antenna is adjusted such that the measured strength of an electromagnetic wave radiated from the antenna is maximized for the purpose of correctly directing a beam radiated from the antenna along the car axis of the car.

JP-A-7-81490 proposes, as the aforementioned adjusting method, a technique for setting a mode in which the strength of a reflection wave electric field of an electromagnetic wave transmitted from a transmitter circuit of a radar is indicated in a receiver circuit of the radar and the mount angle of an antenna of the radar is adjusted such that the electric field strength is maximized.

The above prior art has, however, drawbacks as below. More particularly, in the first place, when the antenna mount angle is adjusted, the electric field strength of the reflection wave of the electromagnetic wave transmitted from the transmitter circuit of the radar must be indicated but generally, an indicator of the radar is not so constructed as to indicate the receiving electric field intensity, so that the aforementioned prior art cannot be used for the adjustment of the axis of general radars.

In the second place, the beam radiated from the antenna must be set so as to be correctly directed toward the running direction of a car of interest, that is, toward the car axis. When the antenna is mounted at an offset position apart from the car axis, the detected value must be adjusted by taking an offset amount into account. Especially, when a mono-pulse radar capable of detecting the azimuth angle in addition to the headway and relative speed between the car of interest and a leading car is concerned, the adjustment of the offset amount of antenna and antenna mount angle is a factor which has an important influence upon the accuracy of correct measurement of the azimuth angle. The conventional method is unsuited for the antenna mount angle adjustment in the mono-pulse radar.

SUMMARY OF THE INVENTION

The present invention contemplate elimination of the above drawbacks of the prior art and it is an object of the invention to provide a method for adjustment of the axis of a car on-board radar, especially, a car on-board mono-pulse radar in which a car axis and an offset axis are set and the mount angle of an antenna mounted at an offset position on the offset axis can be adjusted with high accuracy and with ease through a reduced number of process steps.

To accomplish the above object, according to the present invention, in a method of adjusting the axis of a car on-board radar which can detect at least an azimuth angle with respect to a preceding car, at least two points are set on the car, at least two isosceles triangles having a common base defined by a line connecting the setting points and sides of different lengths are drawn, a line connecting vertexes on the same plane of the obtained isosceles triangles and an extension of that line are determined as a car axis, a radar antenna is mounted on the car at an offset position which is apart from the car axis by a constant distance in the horizontal direction, a straight line parallel to the car axis and passing through the offset position is determined as an offset axis, a reflector is disposed in a direction at a constant azimuth angle as viewed from the offset position of the antenna, and the reflector is used as a detection target of the radar to adjust the mount angle of the radar antenna such that an azimuth angle detection value of the reflector detected by the radar equals a setting value of the azimuth angle.

In the car on-board radar axis adjusting method according to the present invention as above, when the radar antenna is mounted on the car at the offset position which is apart from the car axis by a constant distance in the horizontal direction, at least the two points are set on the car, at least the two isosceles triangles having a common base defined by a line connecting the setting points and sides of different lengths are drawn, a line connecting vertexes on the same plane of the obtained isosceles triangles and an extension of that line are first set as the car axis of the car, a straight line parallel to the car axis and passing through the offset position at which the radar antenna is mounted on the car is then determined as the offset axis, and the reflector is disposed in a direction at a constant azimuth angle as viewed from the offset position of the antenna, thus making preparations for the adjustment. Thereafter, the reflector is used as a detection target of the radar to adjust the mount angle of the radar antenna such that an azimuth angle detection value of the reflector detected by the radar equals a setting value of the azimuth angle. Accordingly, in the car on-board mono-pulse radar, the mount angle of the radar antenna can be maintained with ease and with high precision and the degradation in radar detection accuracy due to the offset mount of the radar antenna apart from the car axis of the car can be prevented.

According to another preferred embodiment of the car on-board radar axis adjusting method according to the present invention, a radar antenna is mounted either on a car axis of a car or at an offset position on the car which is apart from the car axis in the horizontal direction, a reflector is disposed along a boundary line of a maximum detectable area of the radar antenna, radar reflectors are disposed at at least two locations on a boundary line of a desired detectable area of the radar antenna, and the mount angle of the radar antenna is adjusted such that the radar antenna can detect the radar reflectors.

In still another preferred embodiment of the car on-board radar axis adjusting method according to the present invention, a radar antenna is mounted either on a car axis of a car or at an offset position on the car which is apart from the car axis in the horizontal direction, a reflector is disposed ahead of the car along a transmitting axis centered on the transmitting direction of the radar antenna, an azimuth angle detection value of the reflector detected by the radar antenna is set as an initial azimuth angle, and correction is made by using, as a true headway value, a result $\{X, Y\}^T$ obtained by converting coordinates of an apparent headway $\{Xo, Yo\}^T$ detected by the radar antenna pursuant to the following Cartesian coordinates converting equation inclusive of the initial azimuth angle $\theta_0$:

$$\{X, Y\}^T = \begin{bmatrix} \cos(\theta_0 + \theta) & -\sin(\theta_0 + \theta) \\ \sin(\theta_0 + \theta) & \cos(\theta_0 + \theta) \end{bmatrix} \{X_0, Y_0\}^T$$

Further, in still another preferred embodiment of the car on-board radar axis adjusting method according to the present invention, a radar antenna is mounted either on a car axis of a car or at an offset position on the car which is apart from the car axis in the horizontal direction, a temporarily mountable and light reflective reflector is mounted to the transmitting/receiving plane of the radar antenna, light is irradiated on the reflector, and reflection light is detected by a light receiving detector to adjust the mount angle of the radar antenna such that the reflection light reaches within a desired positional area.

Further, in still another preferred embodiment of the car on-board radar axis adjusting method according to the present invention, the radio wave reflector disposed ahead of the radar is a mobile radio wave reflector which can move over a predetermined distance through a predetermined angle with respect to the radio wave transmitting direction, the mount angle of the radar antenna is adjusted to announce detectability or non-detectability of the reflector or the detected value of azimuth angle of the reflector in the form of voice information or displayed visual information.

Furthermore, in still another preferred embodiment of the car on-board radar axis adjusting method according to the present invention, the light receiving detector is a photo-diode detector.

DESCRIPTION OF THE PREFERRED EMBODIMENTS

The present invention will now be described by way of example with reference to the accompanying drawings. In preferred embodiments of a method of adjusting the axis of a car on-board radar according to the present invention to be detailed hereinafter, an antenna of car on-board radar having the function of transmitting and receiving signals is mounted at an offset position apart from the longitudinal axis of a car (the car axis) so that the antenna mount angle may be adjusted with high precision through a reduced number of process steps.

Figure 1:
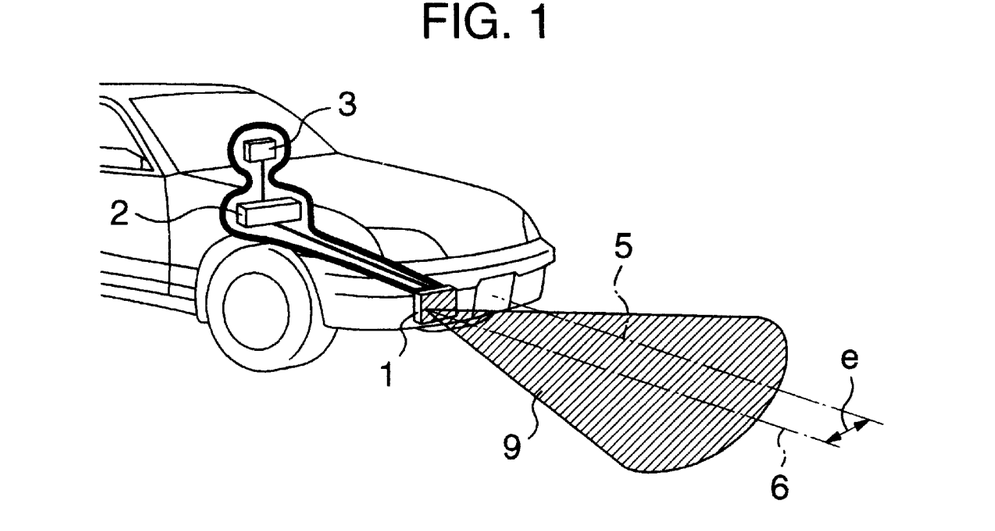
FIG. 1 is a fragmentary perspective view showing the construction of a car on-board radar having an offset antenna used in a car on-board radar axis adjusting method according to the present invention.

Referring now to FIG. 1, an example of a car on-board radar having an offset-mounted antenna used in a car on-board radar axis adjusting method according to the present invention is constructed as shown therein, comprising the radar antenna, as designated by reference numeral 1, a radar signal processor 2 and a headway alarm/indicator 3. The position at which the radar antenna 1 is mounted, that is, an offset position is apart from a longitudinal axis of a car (car axis) 5 by a predetermined offset amount e in the horizontal direction. Here, an axis lying in a direction which is parallel to the car axis 5 so as to be clear of the car axis 5 in the car width direction orthogonal thereto and which passes through the offset position is defined as an offset axis 6.

The antenna 1 incorporates a transmitter circuit for transmitting a millimeter wave, for example, and a receiver circuit for receiving a reflection signal of the millimeter wave. The radar signal processor 2 processes a transmitting/receiving signal from/to the antenna 1 and when a reflector lying in a radar detectable area 9 is detected, it calculates a headway, a relative speed and an azimuth angle with respect to the reflector and decides the degree of danger of collision so as to proceed with the subsequent process of headway alarming.

On the basis of an output signal indicative of, for example, the danger of collision from the radar signal processor 2, the headway alarm/indicator 3 functions to give a car driver an alarm in the form of, for example, audible information such as voice information or displayed visual information. The headway alarm/indicator 3 can also be operated manually to set a timing for the radar to give an alarm.

Figure 2A:
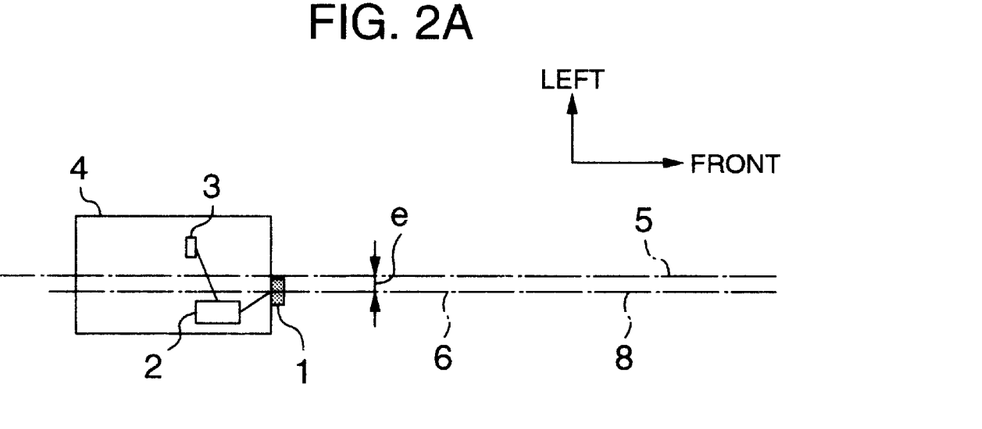
FIG. 2A is a diagram showing an offset mount state of antenna set up in the car on-board radar axis adjusting method according to the invention, especially depicting that the antenna is mounted in a direction of an offset axis which is parallel with a car axis and apart therefrom by an offset amount e.
Figure 2B:
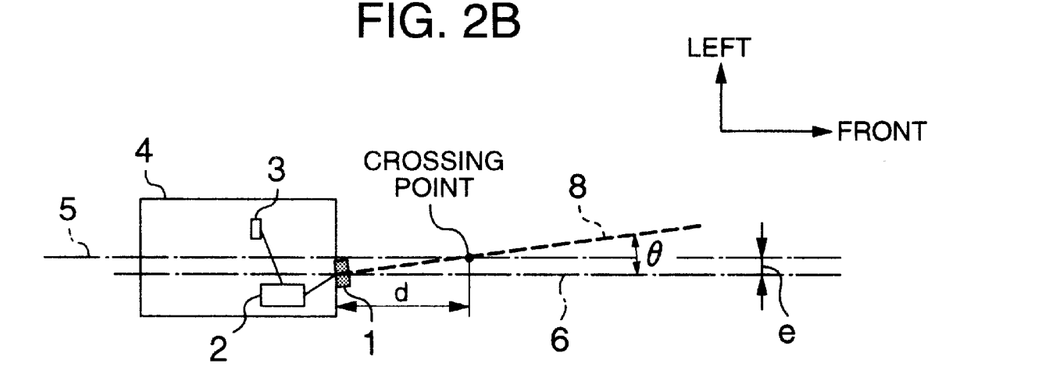
FIG. 2B is a similar view, especially depicting that the antenna is mounted on the offset axis apart from the car axis by the offset amount e while being inclined by an inclination angle of $\theta$ with respect to the car axis.

Referring to FIGS. 2A and 2B, two types of offset mount states of the antenna 1 in the present invention are illustrated. In FIG. 2A, the antenna 1 is mounted at a position which is apart from the car axis 5 by the offset amount e in the horizontal direction and in FIG. 2B, the antenna 1 is mounted at a position apart from the car axis 5 by the offset amount e while being disposed such that a transmitting axis 8 of the antenna is inclined with respect to the car axis 5 by an inclination angle θ to intersect the car axis 5.

Figure 3A:
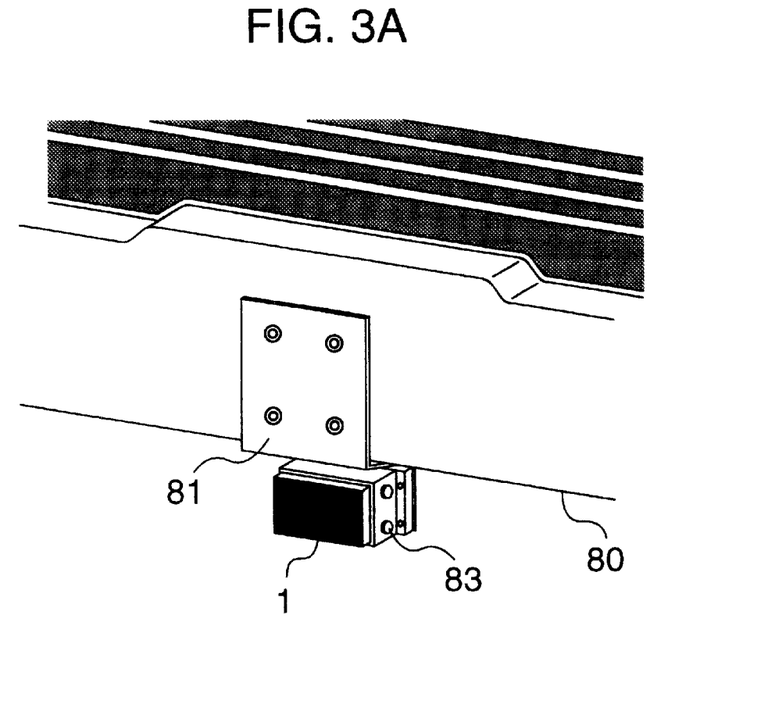
FIG. 3A is a fragmentary perspective view showing a mechanism for adjusting the mount angle of the antenna of the car on-board radar of FIG. 1.
Figure 3B:
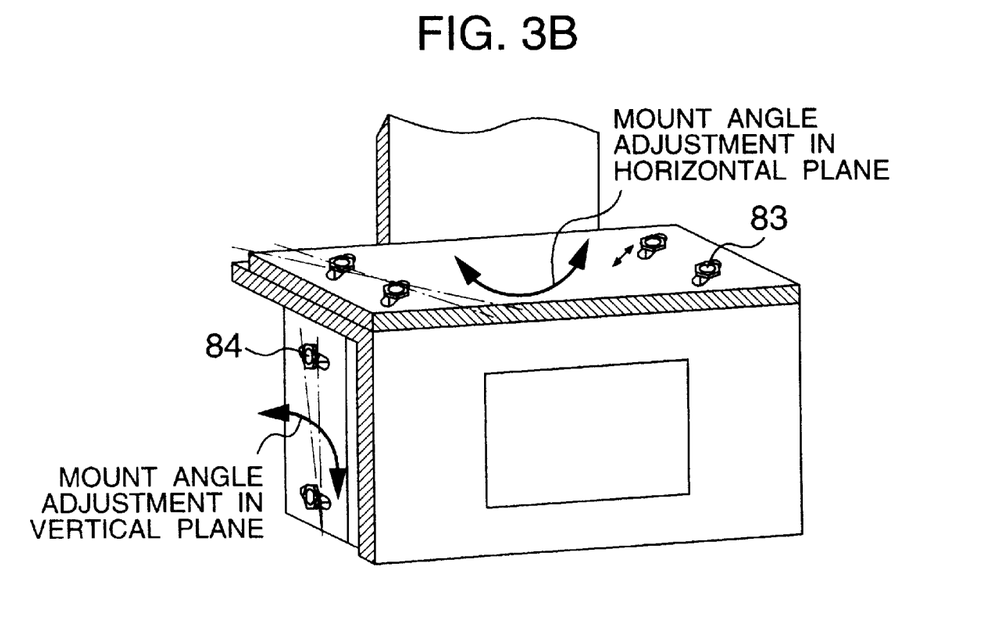
FIG. 3B is a fragmentary perspective view showing details of the mechanism of FIG. 3A.

Referring to FIGS. 3A and 3B, the antenna 1 shown in the two arrangement examples in FIGS. 2A and 2B is fixedly mounted to a frontal bumper 80 of the car through the medium of a bracket 81 to which the antenna is fixed by means of screws 83 and 84. By adjusting tightening of the screws 83 and 84, the transmitting axis 8 or optical axis direction of the antenna 1 can be set desirably so as to be parallel to the car axis 5 or inclined for intersection with the car axis 5 at the given angle θ.

Figure 4:
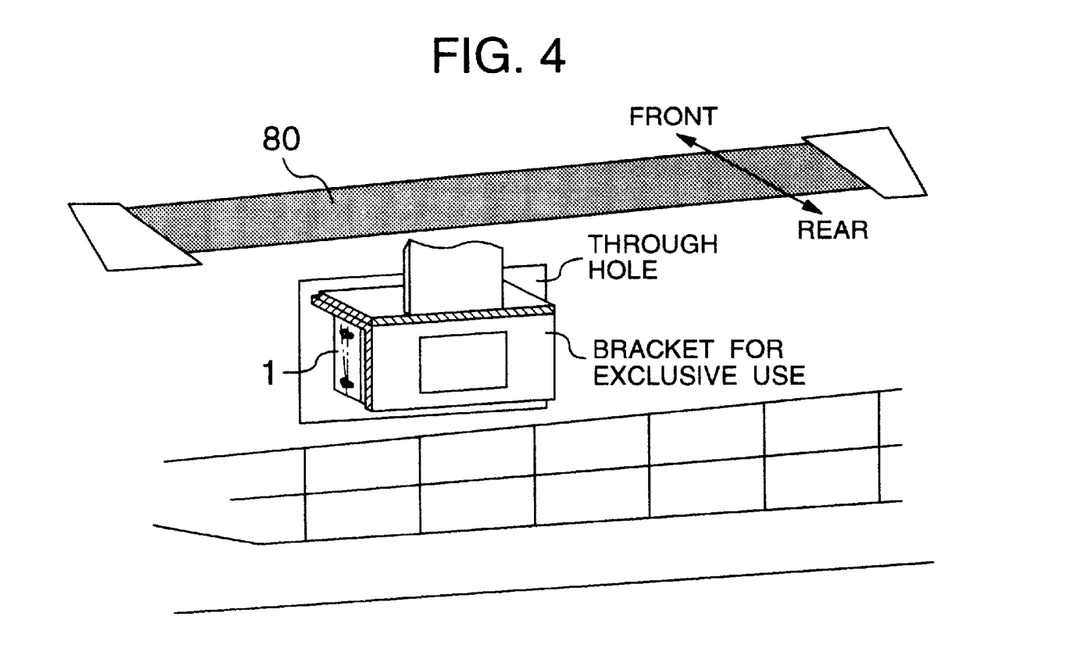
FIG. 4 is a fragmentary perspective view showing the antenna of FIG. 1 car on-board radar which is built inside a bumper.

The mounting method applicable to the aforementioned two arrangement examples is exemplified with reference to FIGS. 3A and 3B but since the millimeter wave can transmit through the bumper resin and the like, the millimeter wave radar can alternatively be built inside the bumper 80 as shown in FIG. 4.

In the two examples of offset-mount arrangement of the antenna 1, the mount angle of the antenna 1 can be adjusted with high precision through a reduced number of process steps as will be detailed below.

Figure 5A:
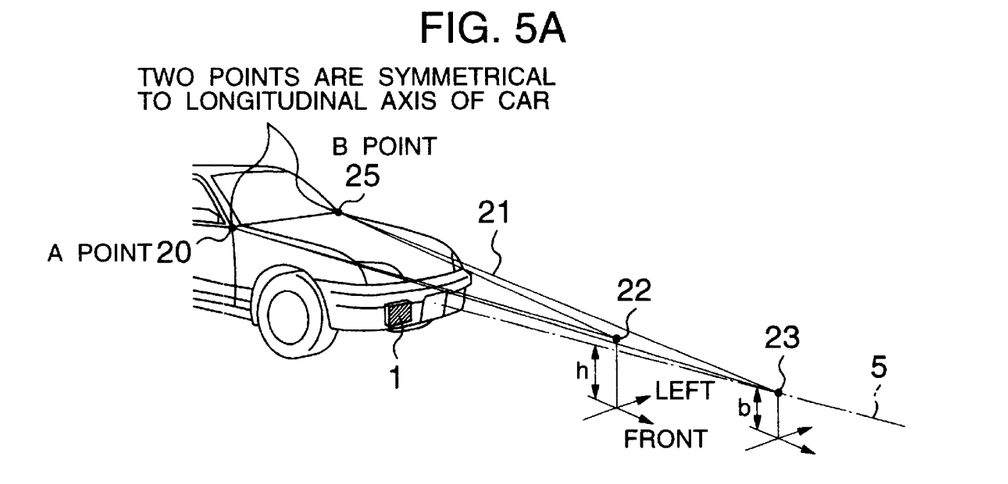
FIG. 5A is a fragmentary perspective view showing an example for determining the car axis and the offset axis in the car on-board axis adjusting method according to the invention.
Figure 5B:
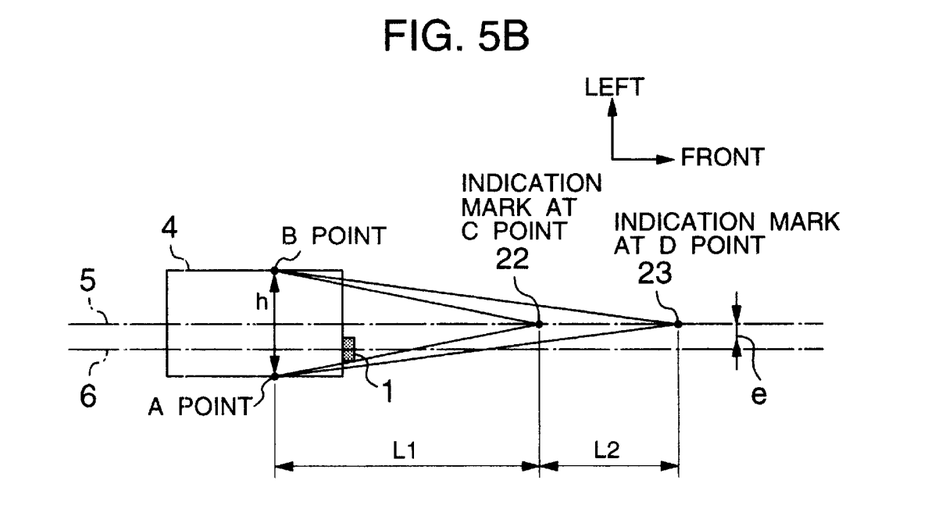
FIG. 5B is a plane view of FIG. 5A.

FIGS. 5A and 5B are useful to explain a method of determining or settling the car axis 5 and offset axis 6 which are necessary criteria for the offset mount of the antenna 1.

FIG. 5A depicts, in fragmentary perspective view form, two points of A point 20 and B point 25 on the car 4 which are symmetrical to the car axis 5, line segments 21 subtending the car axis 5, an indication mark 22 at C point, an indication mark 23 at D point and the antenna 1. The C and D points are at the same altitude from the ground. FIG. 5B is a plan view of FIG. 5A, demonstrating that when a side AC equals a side BC in length and a side AD equals a side BD in length, a line connecting the indication mark 22 at C point and the indication mark 23 at point D lies on the car axis 5. The offset axis 6 is parallel to the car axis 5 while passing through the offset position which is apart from the car axis 5 by the offset amount e in the car width direction. In actual work, the line segments AC, AD, BC and BD can be established in any ways including a way using a piano wire or a flexible rope and a way using optical means.

Figure 6:
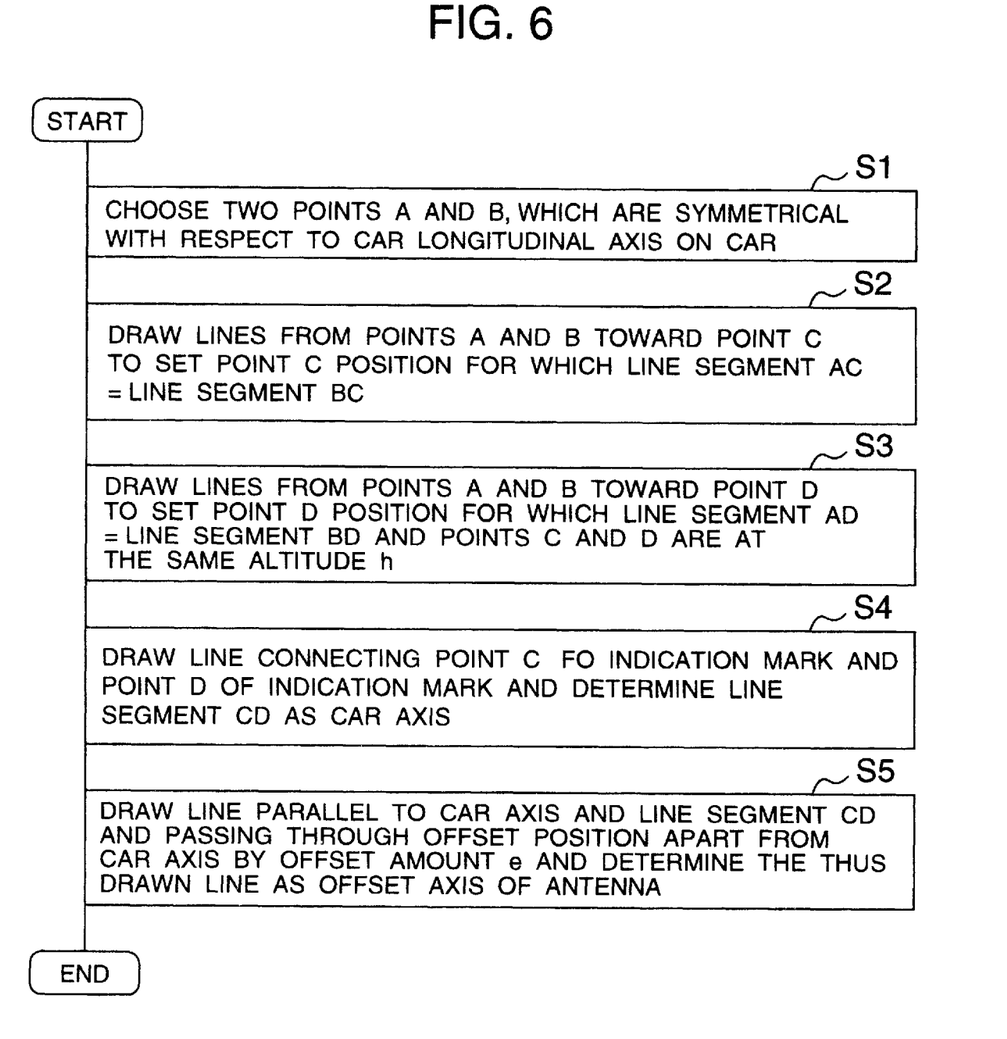
FIG. 6 is a flow chart showing the procedures for determining the car axis and the offset axis in the example of FIG. 5A.

Referring to FIG. 6, there is illustrated a flow chart showing the procedures for determining or settling the car axis 5 and offset axis 6. In step S1 of the procedures, the two points of A point 20 and B point 25 which are symmetrical to the car axis 5 are chosen on the car 4 and in step S2, lines are drawn from the A and B points toward the C point in order to determine the C point position of indication mark 22 for which the length of the side AC equals that of the side BC. Next, in step s3, lines for the sides AD and BD are again drawn from the A and B points, respectively, in order to determine the D point position of indication mark 23 for which the side AD equals the side BD in length and the D and C points are at the same altitude from the ground. In step S4, a line segment CD connecting the obtained C point of indication mark position 22 and D point of indication mark position 23 is determined as the car axis 5. Further, in step S5, an axis in a direction which is parallel to the car axis 5 while passing through the offset position apart from the car axis 5 by a desired offset amount e in the car width direction orthogonal to the car axis 5 is determined as the offset axis 6. Through the above method, the car axis 5 and offset axis 6 necessary for the offset mount of antenna 1 can be determined or settled.

Figure 7A:
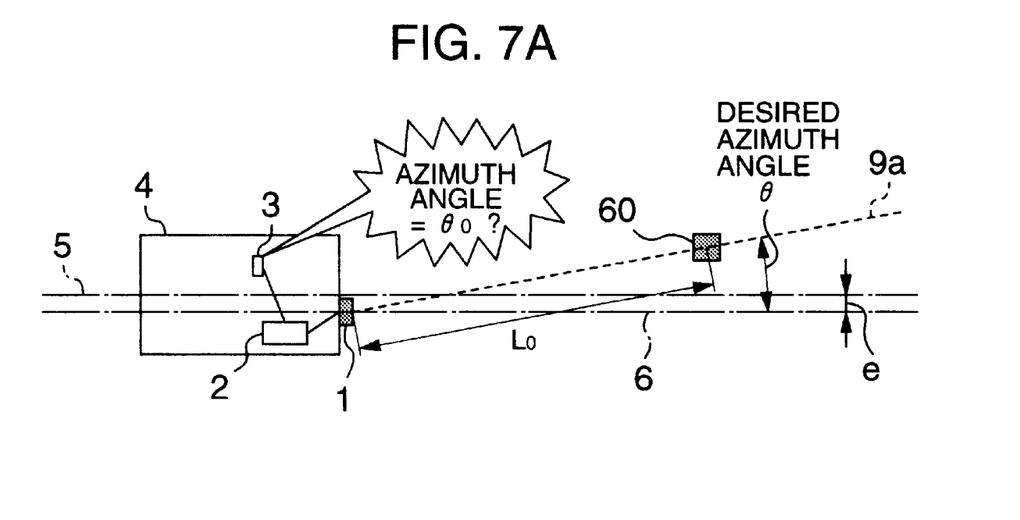
FIG. 7A is a diagram for explaining a first embodiment of the car on-board radar axis adjusting method in which the antenna mount angle is adjusted such that an azimuth angle detection value equals an azimuth setting value.
Figure 7B:
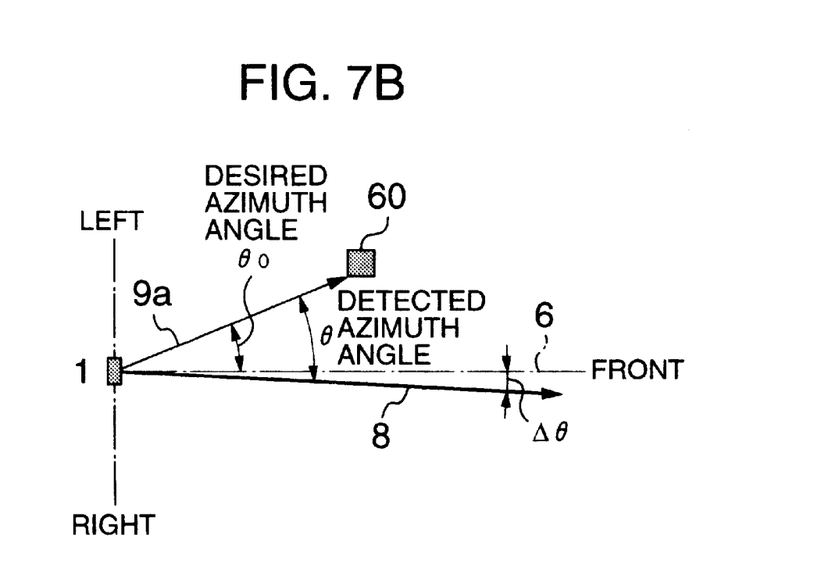
FIG. 7B is a diagram showing details of FIG. 7A.

Referring to FIGS. 7A and 7B, a first embodiment of a car on-board radar axis adjusting method according to the invention will be described in which the mount angle of an offset antenna 1 is adjusted by using an azimuth angle detection value. In the embodiment shown in FIG. 7A, for adjustment of the mount angle of the antenna 1, a car axis 5 of a car 4, an offset axis 6, the antenna 1 of radar, a radar signal processor 2, a headway alarm/indicator 3 and an electric wave reflector 60 are used.

Firstly, through the above-described method for determination of the car axis 5 and offset axis 6, the car axis 5 and the offset axis 6 are settled and the antenna 1 is temporarily mounted at an offset position. Further, in a direction of a line 9a extending from the offset position at a desired azimuth angle ($θ_0$), the reflector 60 is disposed at a distance of $L_0$ from the antenna 1. As detailed in FIG. 7B, a transmitting axis 8 of the antenna 1 does not coincide with the offset axis 6 of the antenna 1 and as a result, the azimuth angle detection value (θ) detected by the radar differs from the desired azimuth angle ($θ_0$) of line 9a by an error Δθ.

Figure 8:
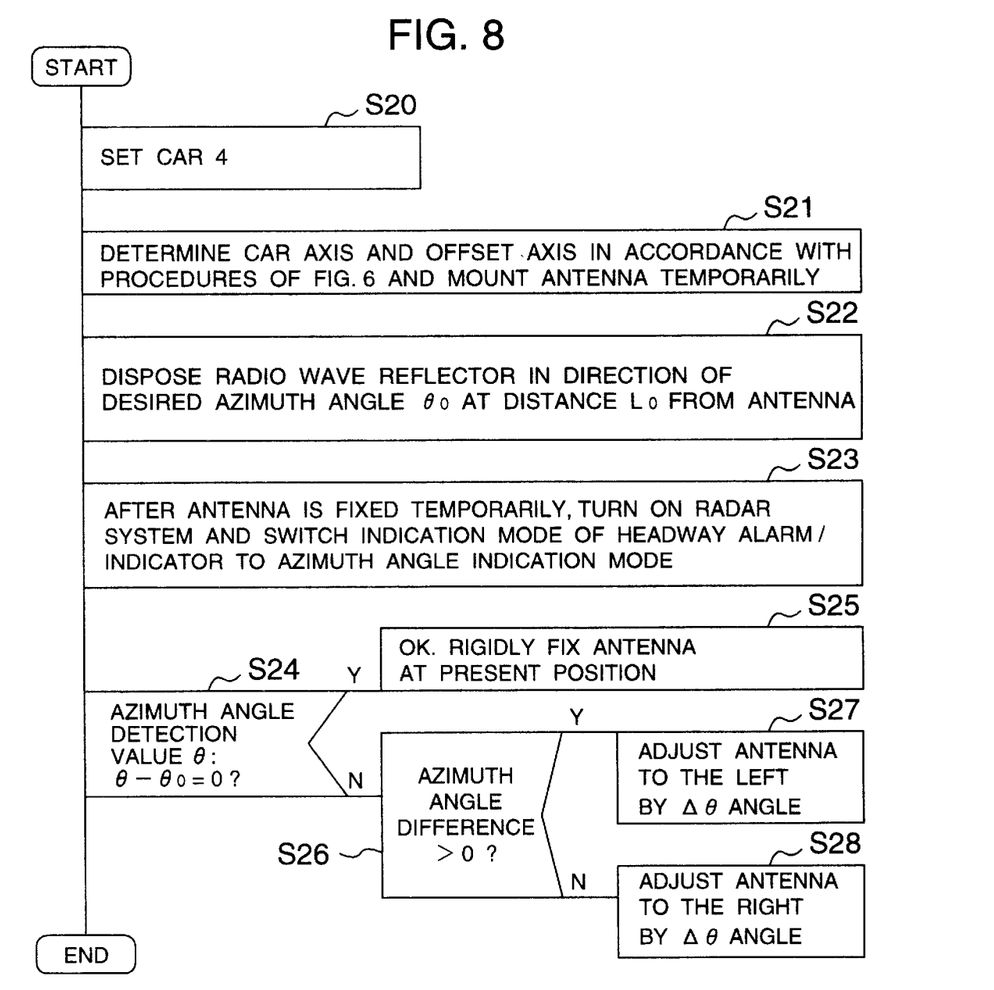
FIG. 8 is a flow chart showing the procedures for antenna mount angle adjustment in the car on-board radar axis adjusting method of FIG. 7A.

Next, the procedures for adjusting the mount angle of the antenna 1 by using the azimuth angle detection value θ such that the error Δθ is made to be zero will be described with reference to a flow chart of FIG. 8. Firstly, in step S20, the car 4 is set at a given location and in step S21, the car axis 5 and the offset axis 6 of the antenna 1 are determined in accordance with the procedures of FIG. 6 and the antenna 1 is temporarily mounted on the thus determined offset axis 6.

In step S22, the electromagnetic wave reflector 60 is disposed at a relative distance of $L_0$ in the direction of the line 9a on which the azimuth angle is of the desired azimuth angle ($\theta_0$) and in step S23, after the antenna 1 is fixed temporarily, the radar system is turned on and the indication mode of the headway alarm/indicator 3 is switched to an azimuth angle indication mode. In step S24, a difference $\Delta\theta$ between the azimuth angle detection value ($\theta$) detected by the radar and the desired azimuth angle ($\theta_0$) is indicated. If $\Delta\theta=0$, the antenna is rigidly fixed at the present position in step S25 to complete the adjustment of the mount angle of the antenna 1.

On the other hand, if the difference Ae is determined not to be zero in the step S24, the program proceeds to step S26 and if the difference $\Delta\theta$ is determined to be $\Delta\theta>0$ in the step S26, the antenna 1 is adjusted by $\Delta\theta$ angle to the left of the offset axis 6 in step S27. If the difference $\Delta\theta$ is determined to be $\Delta\theta<0$, the antenna 1 is adjusted by $\Delta\theta$ angle to the right of the offset axis 6 in step S28.

In this manner, the mount angle of the antenna 1 can be adjusted by using the azimuth angle detection value $\theta$ of reflector 60 detected by the radar and the desired azimuth angle ($\theta_0$).

Referring now to FIG. 9, FIGS. 10A, 10B and 10C, FIG. 11, FIGS. 12A, 12B and 12C and FIG. 13, a second embodiment of the car on-board radar axis adjusting method according to the invention will be described.

In the present method, the mount angle of the antenna is adjusted through two stages of which one is for offset adjustment using a point light source and a photodiode detector and the other is for azimuth angle adjustment using a means for setting radar signal processing software.

Firstly, the offset adjustment for the mount angle of antenna 1 based on a point light source 30 and a photodiode detector 31 will be described with reference to FIGS. 9, 10A, 10B, 10C and 11.

Figure 9:
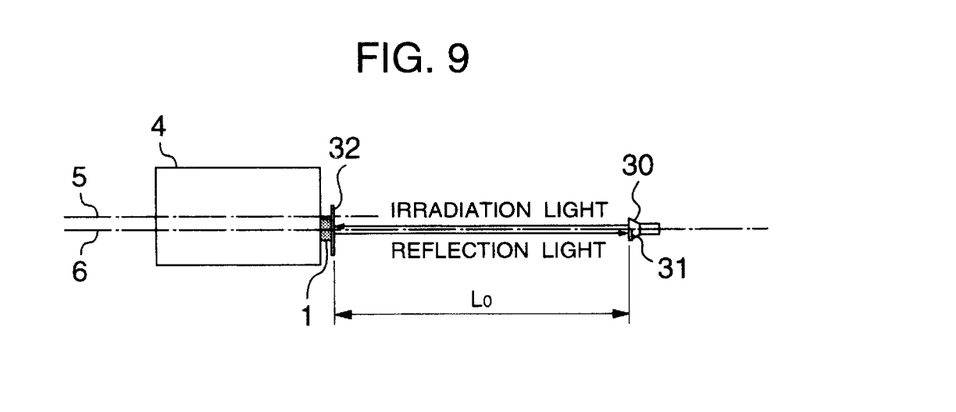
FIG. 9 is a diagram showing a first stage in a second embodiment of the car on-board radar axis adjusting method according to the invention in which the antenna mount angle is adjusted by using irradiation light and reflection light of a point light source.

Illustrated in FIG. 9 are the antenna 1, a car 4, a car axis 5, the point light source 30 disposed on an offset axis 6 at a distance of Lo from the antenna 1, a reflection mirror 32 for reflecting light irradiated from the point light source and the photodiode detector 31 for indicating a calibration error of the mount angle of antenna 1. In the car on-board radar axis adjusting method, the reflection mirror 32 is mounted to the transmitting/receiving plane of the antenna 1 temporarily fixed to the car 4, irradiation light of the point light source 30 is reflected by the reflection mirror 32 and reflection light from the mirror is detected by means of the photodiode detector 31.

Figure 10A:
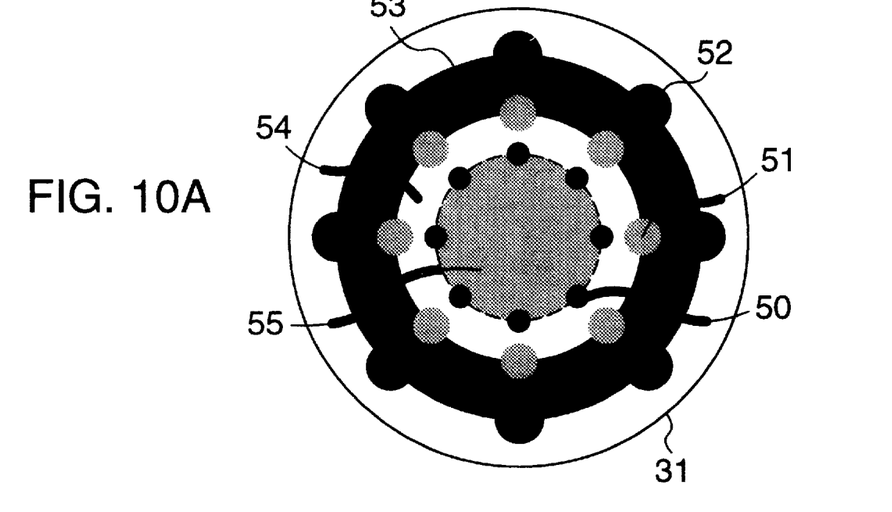
FIG. 10A is a diagram showing an example of an error indicator which indicates adjustment results in the car on-board radar axis adjusting method of FIG. 9.

The photodiode detector 31 serving as an indicator of calibration error is illustrated in FIG. 10A. The detector 31 has a light receiving photodiode group 53 for red luminescence consisting of photodiodes 52 for red luminescence, a light receiving photodiode group 54 for yellow luminescence consisting of photodiodes 51 for yellow luminescence and a light receiving photodiode group 55 for green luminescence consisting of photodiodes 50 for green luminescence. These groups are arranged concentrically to receive a reflection light beam from the reflection mirror 32. With this detector, depending on the position of light reflection, a light emitting photodiode at the specified position for the specified color is lit and the mount angle of the antenna 1 (reflection mirror 32) is adjusted until the photodiode 50 for green luminescence lying in a desired reflection area is lit.

Figure 10B:
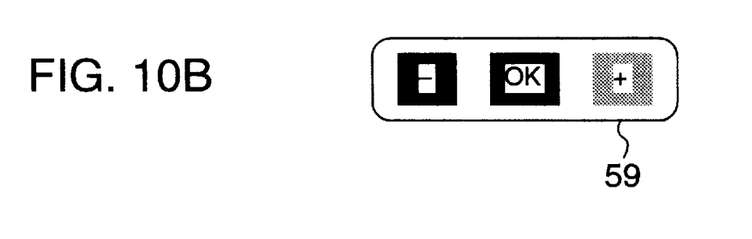
FIG. 10B is a diagram showing another example of the error indicator.
Figure 10C:
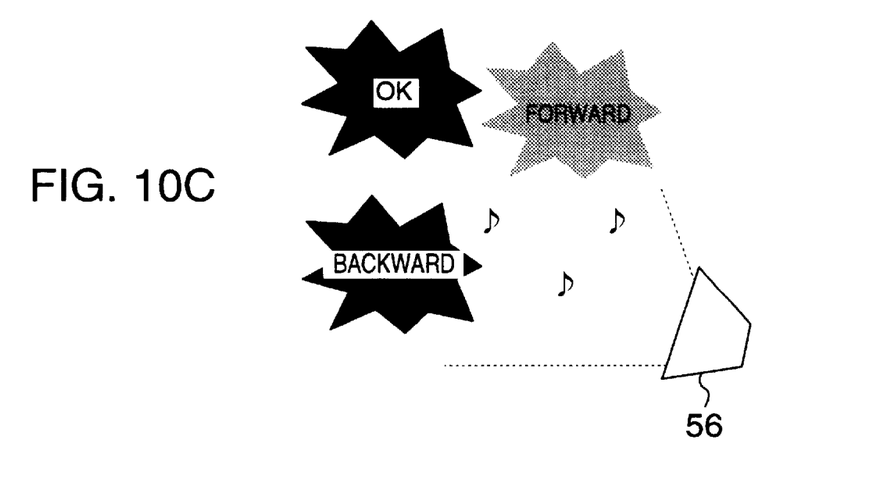
FIG. 10C is a diagram showing still another example of the error indicator.

Alternatively, as the indicator of calibration error, either an indicator board 59 for visual information such as letters and numerals as shown in FIG. 10B or a loudspeaker 56 for informing an operator of audible information such as voice information may be used. When the absolute value ($\Delta\delta 1$) of the present calibration error exceeds the absolute value ($\Delta\delta_0$) of the calibration error in the preceding step during adjustment of the direction of antenna 1, the indicator of calibration error makes an announcement in the form of a "+" display or voice. On the other hand, if $\Delta\delta 1 < \Delta\delta_0$, it makes an announcement in the form of a "−" display or voice. Further, if $\Delta\delta 1 = \Delta\delta_0$, the present adjusting position is determined to be optimal and the indicator makes an announcement in the form of "OK" display or voice.

Procedures for the offset adjustment of antenna 1 in the second embodiment of car on-board radar axis adjusting method will be described with reference to a flow chart of FIG. 11.

Firstly, the car 4 is set in step S60, and in step S61, the car axis 5 and offset axis 6 of the car 4 are determined in accordance with the procedures of FIG. 6 and the antenna 1 is mounted temporarily on the offset axis 6 of the car 4. In step S62, the point light source 30 and photodiode detector 31 are disposed on the offset axis 6 at a distance of $L_0$ from the antenna 1 and in step S63, the reflection mirror 32 is mounted to the transmitting/receiving plane of the antenna 1.

Further, in step S64, light from the point light source 30 is irradiated on the reflection mirror 32 and a reflection light beam from the mirror is received by the light receiving photodiode of the photodiode detector 31. Depending on the position of reflection, a light emitting photodiode for specified color is lit and so it is decided whether the photodiode 50 for green luminescence is lit. If the photodiode 50 for green luminescence is lit, the present mount position is determined to be an optimal adjusting position of the antenna 1 and the antenna 1 is rigidly tightened at that position in step S65. On the other hand, when the photodiode 50 for green luminescence is not lit but the photodiode for red or yellow luminescence is lit, the mount angle of the antenna 1 is again adjusted in step S66. In this manner, the offset adjustment of the antenna 1 can be carried out in accordance with the second embodiment of the car on-board radar axis adjusting method.

Referring to FIGS. 12A, 12B, 12C and 13, the second stage in the second embodiment of the car on-board radar axis adjusting method according to the present invention will be described. In the second stage, an initial azimuth angle ($\theta_0$) is set in software built in the radar signal processor 2 in order to perform the azimuth angle adjustment of antenna 1.

Figure 12A:
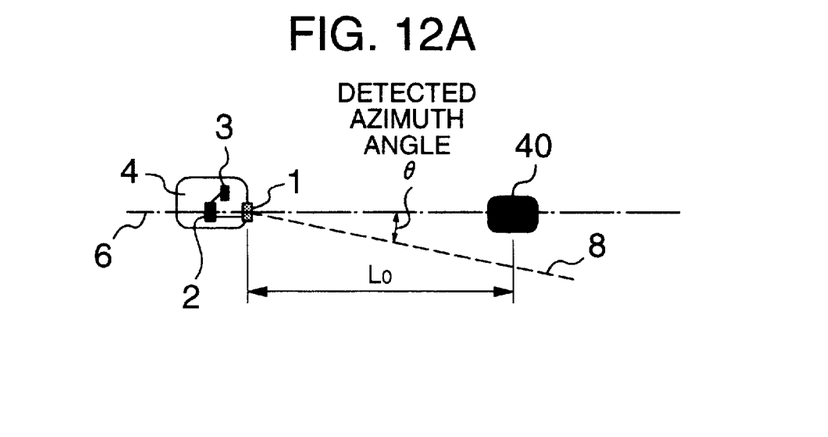
FIG. 12A is a diagram showing a second stage in the second embodiment of the car on-board radar axis adjusting method according to the invention in which the antenna mount angle is adjusted by using an initial azimuth angle set in software.

FIG. 12A depicts the antenna 1, the radar signal processor 2 incorporating radar signal processing software, the headway alarm/indicator 3 having the function of indicating and setting an azimuth angle of an obstacle, and a reflector 40. The reflector 40 is disposed on the offset axis 6 at a distance of $L_0$ from the antenna 1. If the offset axis 6 coincides with a transmitting axis 8 of the antenna 1, the value of azimuth angle ($\theta$) of reflector 40 detected by the radar is zero. But when the azimuth angle is detected by using the offset-adjusted antenna 1, there occurs an azimuth error (corresponding to azimuth angle detection value $\theta$, due to an inclination of the electric wave transmitting axis 8 with respect to the offset axis 6 of the antenna 1. Then, the azimuth angle detection value $\theta$ of this offset-adjusted antenna 1 is considered as an initial azimuth angle ($\theta_0$), the initial azimuth angle $\theta_0$ is set in the software incorporated in the radar signal processor 2, coordinate conversion of a detected headway value is calculated by using the initial azimuth angle ($\theta_0$) and the thus obtained headway value is set to provide an alarming headway value for control of the headway.

Figure 12B:
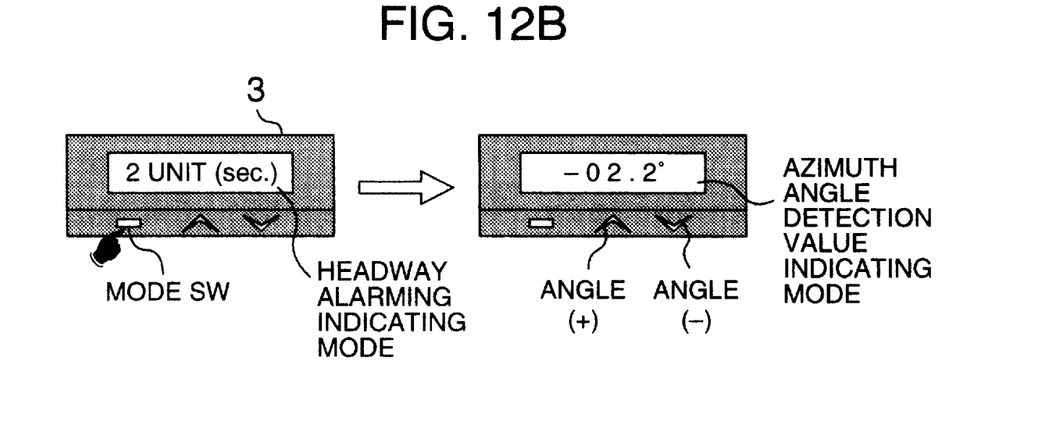
FIG. 12B is a diagram showing an example of a headway alarming indicator used in the FIG. 12A method.

FIG. 12B depicts an azimuth angle indicating mode of the headway alarm/indicator 3. By depressing a mode switch, the indication mode can be switched from the normal headway alarming/indicating mode to the azimuth angle indicating mode for indicating an azimuth angle detection value. When angle (+) and angle (−) switches as shown in FIG. 12B are depressed simultaneously, the azimuth angle indicating mode of the headway alarm/indicator 3 can be switched to an initial azimuth angle setting mode as shown in FIG. 12C.

Figure 12C:
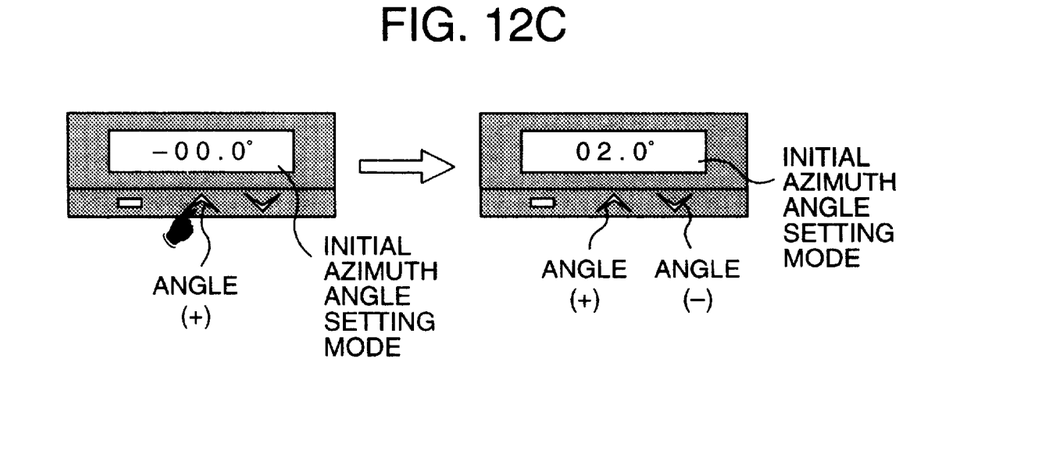
FIG. 12C is a diagram showing another example of the indicator used in the FIG. 12A method.

FIG. 12C depicts the initial azimuth angle setting mode in which the aforementioned azimuth angle detection value $\theta$ can be set as the initial azimuth angle ($\theta_0$) by operating either the angle (+) switch or the angle (−) switch.

Figure 13:
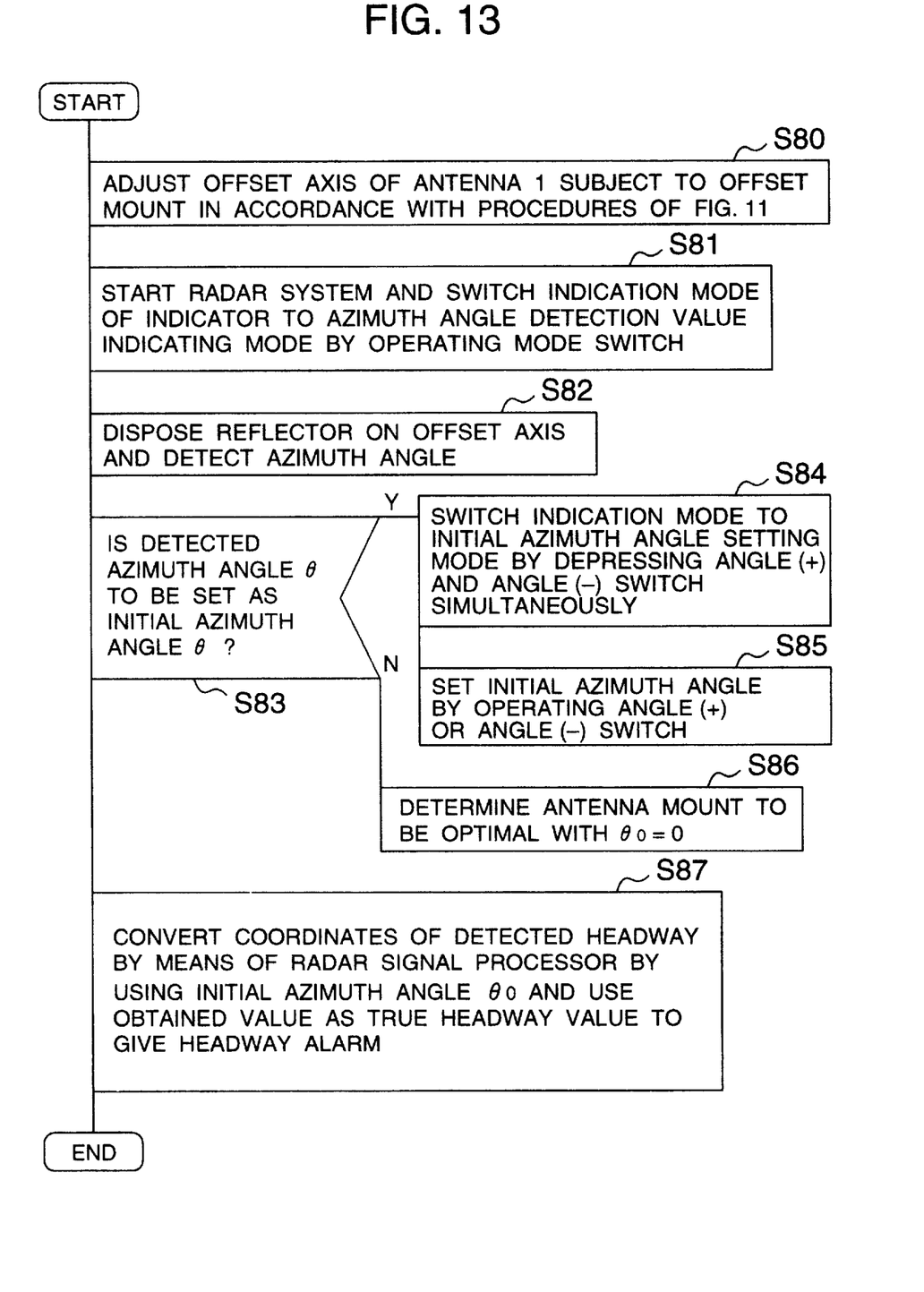
FIG. 13 is a flow chart showing the procedures for adjusting the antenna mount angle by using the initial azimuth angle in software in the car on-board radar axis adjusting method of FIG. 12A.

FIG. 13 is a flow chart for explaining the procedures of adjusting the azimuth angle of the antenna 1.

Figure 11:
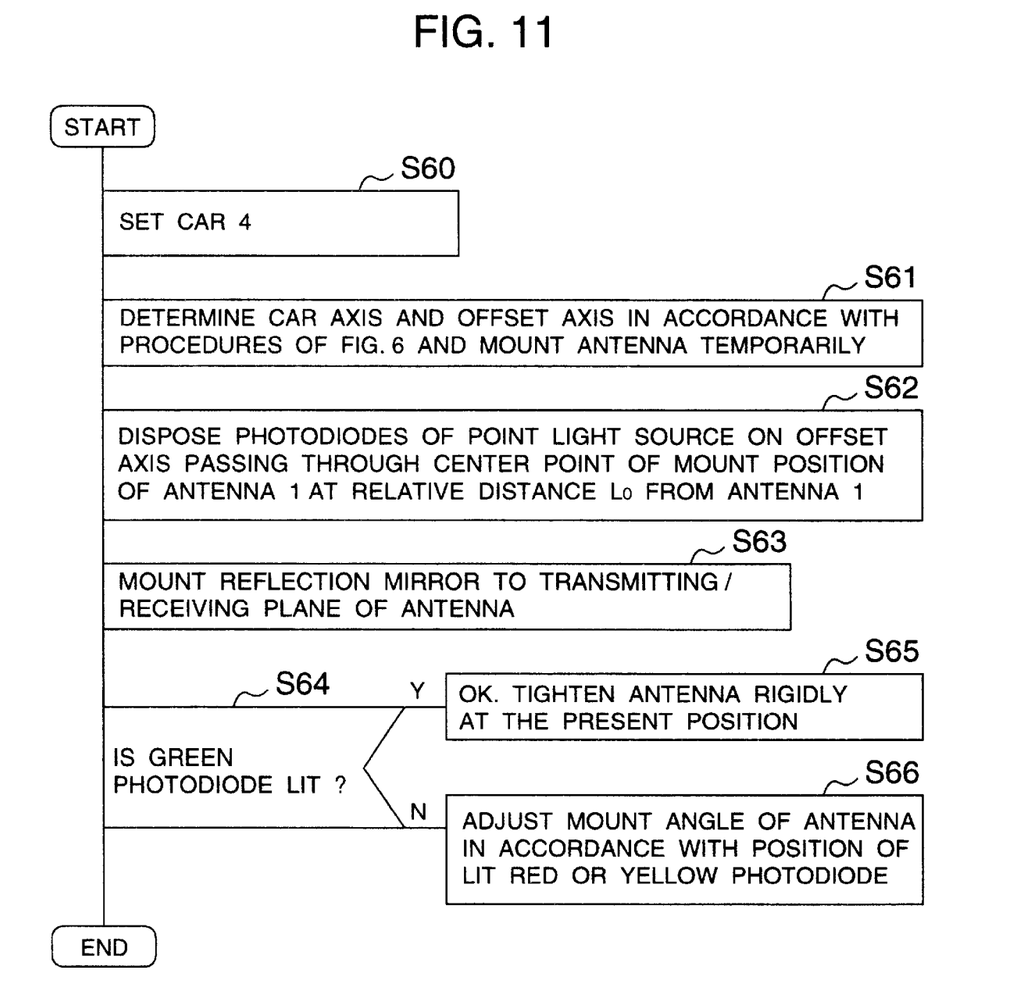
FIG. 11 is a flow chart showing the procedures for adjusting the antenna mount angle by using irradiation light and reflection light of the point light source in the FIG. 9 car on-board radar axis adjusting method.

Firstly, the offset adjustment of the antenna 1 is carried out in accordance with the procedures of FIG. 11 in step S80 and then, the mode switch (Mode SW) of the headway alarm/indicator 3 is depressed in step S81 to switch the indication mode to the azimuth angle indicating mode for indicating the headway and the azimuth angle. Thereafter, in step S82, the reflector 40 is disposed on the offset axis 6 of the antenna 1 and an azimuth angle ($\theta$) of the reflector 40 is detected by means of the radar. In step S83, it is decided whether the detected azimuth angle $\theta$ is to be set as an initial azimuth angle $\theta_0$ and if $\theta \neq 0$, the value of the detected azimuth angle ($\theta$) is set as the initial azimuth angle and the angle (+) and angle (−) switches of the headway alarm/indicator 3 are depressed simultaneously to switch the indication mode to the initial azimuth angle setting mode. Subsequently, in step S85, the initial azimuth angle ($\theta_0$) is so set as to have the aforementioned detected azimuth angle value $\theta$ by operating the angle (+) or angle (−) switch.

On the other hand, if $\theta=0$ in the step S83, the mount angle adjustment for the antenna 1 has already been optimized and therefore, in step S86, the detected angle is set as the initial azimuth angle ($\theta^0$). In step S87, through the signal processing by the radar signal processor 2, the detected headway value is calculated for conversion pursuant to the following coordinate conversion equation using the initial azimuth angle ($\theta_0$) and an obtained result is used as an alarming headway value to give a headway alarm.

$$\{X, Y\}^T = \begin{bmatrix} \cos(\theta_0 + \theta) & -\sin(\theta_0 + \theta) \\ \sin(\theta_0 + \theta) & \cos(\theta_0 + \theta) \end{bmatrix} \{X_0, Y_0\}^T$$

As described above, in the second stage of the second embodiment, the initial azimuth angle is set in the software incorporated in the radar signal processor 2 to effect the azimuth angle adjustment of the antenna 1.

Figure 14:
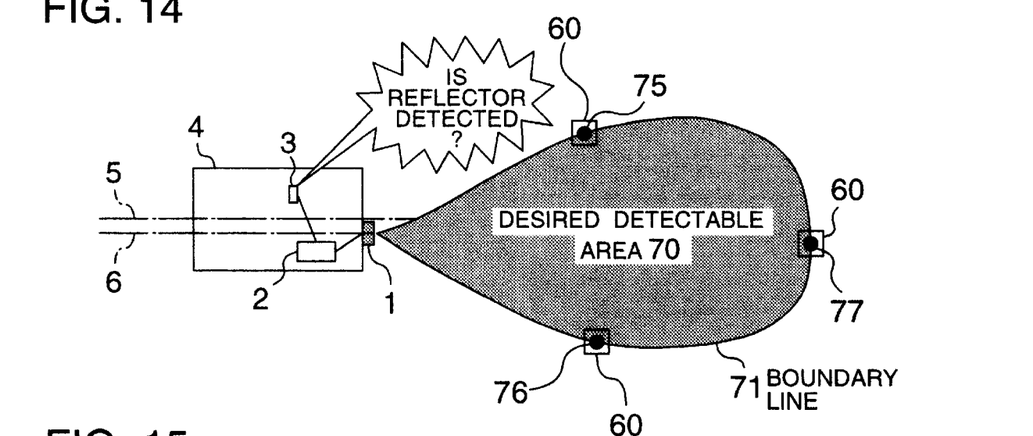
FIG. 14 is a diagram showing a third embodiment of the car on-board radar axis adjusting method according to the present invention in which the antenna mount angle is adjusted such that the radar detectable area coincides with a desired detectable area in the horizontal direction.
Figure 15:
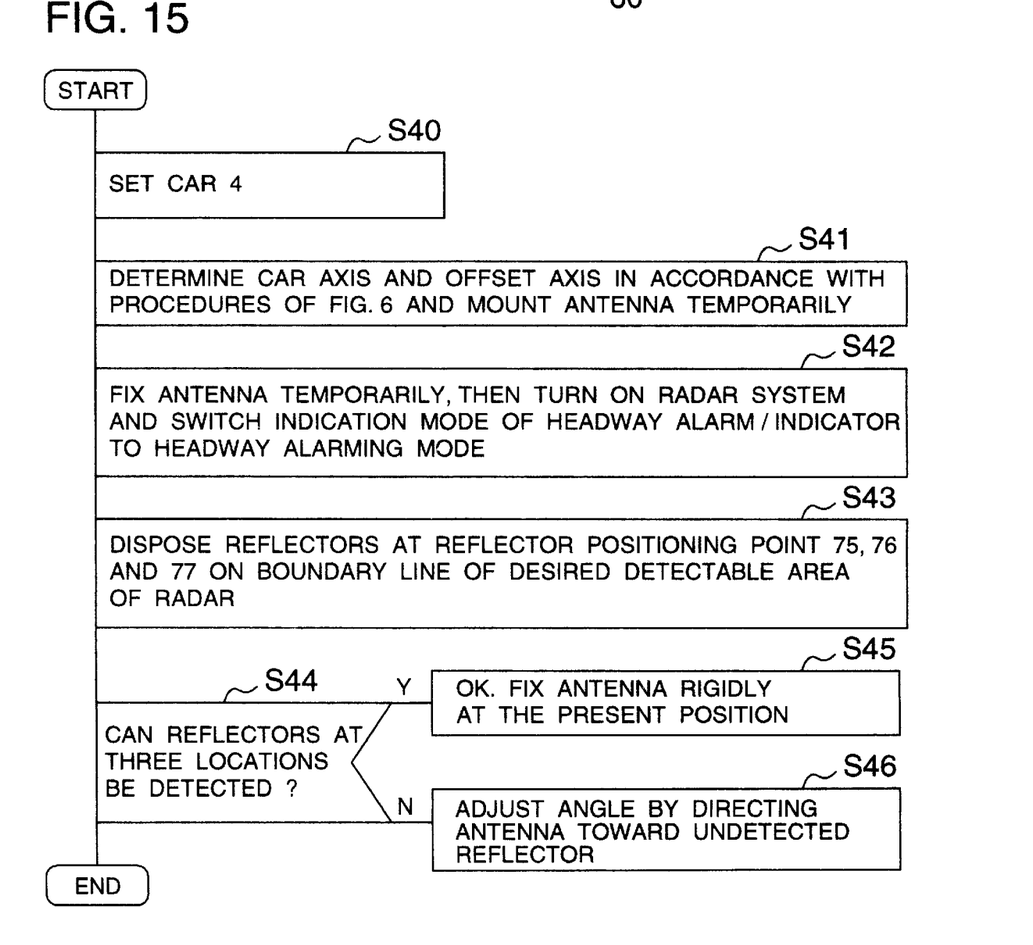
FIG. 15 is a flow chart showing the procedures for adjusting the antenna mount angle such that the radar detectable area coincides with the desired detectable area in the car on-board radar axis adjusting method of FIG. 14.

Referring now to FIGS. 14 and 15, a third embodiment of the axis adjusting method according to the present invention will be described. In the present embodiment, the mount angle of an antenna 1 is adjusted by using the radar detectable area.

Illustrated in FIG. 14 are the antenna 1, a radar signal processor 2, a headway indicator 3, a car 4, a car axis 5, an offset axis 6, reflectors 60 for reflection of electromagnetic wave or light, a desired detectable area 70 of radar, a boundary line 71 of the desired detectable area in the horizontal direction, positioning points 75 and 76 at which the reflectors 60 for verifying a desired detection width of the antenna 1 are set, and a positioning point 77 at which the reflector 60 for verifying a maximum detection range of the antenna 1 is set.

In the third embodiment, the headway alarm/indicator 3 gives an alarm and an indication depending on whether the radar having the antenna 1 temporarily disposed at the offset position on the car 4 can detect the reflectors 60 disposed at the positioning points 75, 76 and 77 sequentially or simultaneously, in order for the mount angle of the antenna 1 to be adjusted such that the reflectors 60 at the three locations can be detected.

FIG. 15 is a flow chart for explaining the procedures of adjusting the mount angle of the antenna 1 in the third embodiment. In step S40, the car 4 is set and in step S41, the car axis 5 and offset axis 6 of the car 4 are determined in accordance with the procedures of FIG. 6. In step S42, the antenna 1 is fixed temporarily at the offset position and the radar is turned on to operate the headway alarm system. In step S43, the reflectors 60 are disposed at their set positioning points 75, 76 and 77, respectively, on the boundary line 71 of the desired detectable area 70 of radar.

In step S44, the mount angle of the antenna 1 is detected depending on whether the headway alarm/indicator 3 sequentially gives, three times, alarms purporting that the respective reflectors 60 disposed as above are detected. When the reflectors 60 are detected at the three reflector positioning points 75, 76 and 77, the present mount position of the antenna 1 is determined to be optimal and the antenna 1 is rigidly fixed at the present point in step S45.

On the other hand, when the reflectors 60 at the two locations at the most are detected, the mount angle is adjusted in step S46 by directing the antenna 1 toward the undetected reflector so that detection of the three reflectors may be completed.

In the third embodiment, the car on-board radar axis adjustment can be achieved by adjusting the mount angle of the antenna 1 such that the radar detectable area can cover the desired detectable area 70 in the horizontal direction.

Figure 16:
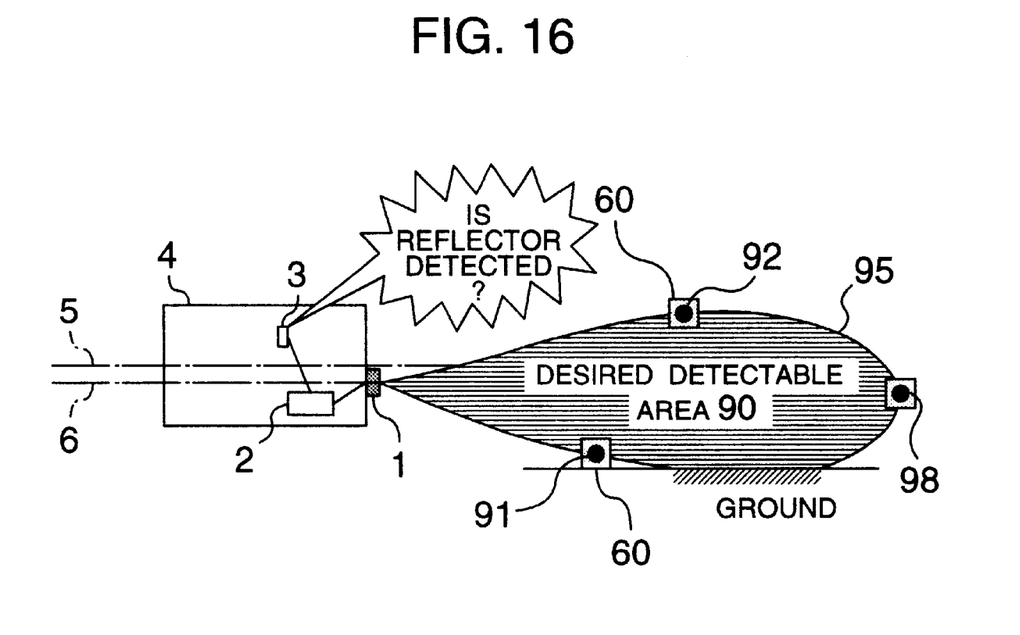
FIG. 16 is a diagram showing an example of adjusting the antenna mount angle such that the radar detectable area coincides with a desired detectable area in the vertical direction in the car on-board radar axis adjusting method of FIG. 14.

The adjusting method for covering the desired detectable area is exemplified in the foregoing but in the case of the millimeter waver radar, the radio wave radiation area in the vertical direction must also be adjusted. In the third embodiment, set positioning points 91, 92 and 93 of radio wave reflectors 60 are also set as shown in FIG. 16 such that a radio wave irradiated from the millimeter wave radar can cover a desired detectable area 90 in the vertical direction. As described above, in the third embodiment, the mount angle of the antenna 1 can be adjusted through a reduced number of process steps by adjusting the axis so that the two kinds of desired detectable areas in the horizontal and vertical directions may be covered.

The car on-board radar axis adjusting method of the present invention has been described by referring to the three preferred embodiments but the present invention is in no way limited to the foregoing embodiments and can be changed or altered in design in various ways without departing from the spirit of the present invention recited in the claims.

For example, in the foregoing embodiments, the mount angle adjusting method has been described as being applied to the radio wave radar of mono-pulse type capable of detecting the azimuth angle but in essentiality, the present invention is not limited thereto and may also be practiced in a radio wave radar of scan type or an optical radar using laser.

Figure 17:
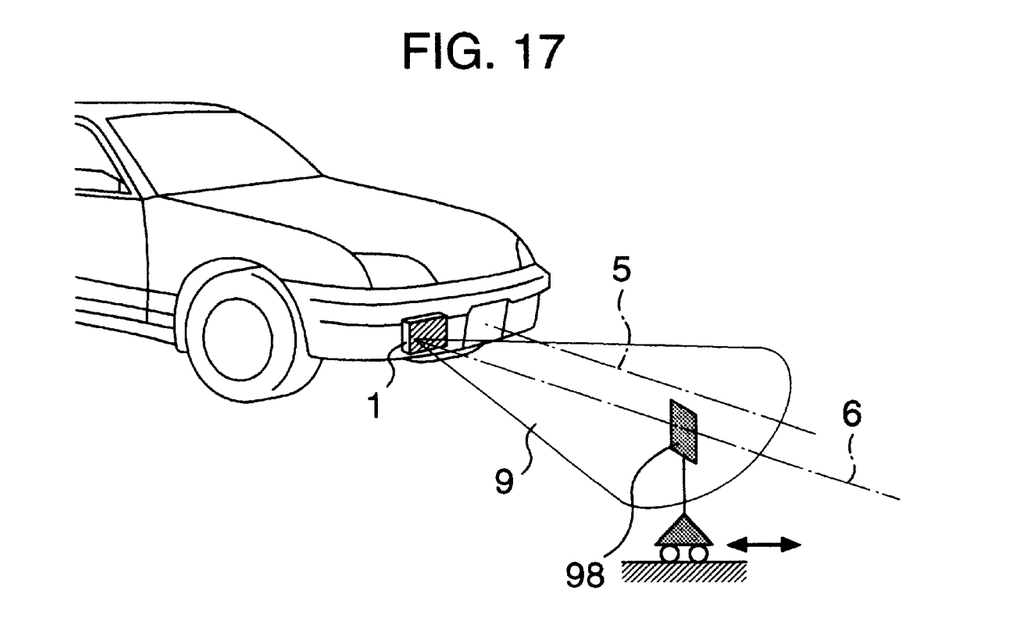
FIG. 17 is a fragmentary perspective view showing still another embodiment of the car on-board radar axis adjusting method according to the invention in which a mobile radio wave reflector is disposed ahead of the radar.

In the case where the radio wave reflector is a stationary target and there arises a problem that when, for example, a millimeter wave radar of two-frequency CW type is used, the target cannot be detected at the relative speed being 0 (zero). In such a case, a mobile radio wave reflector 98, which is movable to and fro as shown in FIG. 17, is used to generate a relative speed so as to permit the detection of a distance between the antenna and the electric wave reflector 98. The mount angle of antenna 1 can be adjusted through the adjusting procedures similar to those in the foregoing embodiments.

As will be seen from the foregoing description, in the car on-board radar axis adjusting method according to the present invention, after making preparations for adjustment by setting the car axis and the offset axis of radar antenna which is parallel to the car axis and disposing the reflector in a direction at a predetermined azimuth angle as viewed from the offset position, the reflector is used as a detection target of the radar and the mount angle of the radar antenna is adjusted such that an azimuth angle detection value of the reflector detected by the radar equals a setting value of the azimuth angle. Accordingly, the mount angle of the radar antenna can be maintained with ease and with high precision and degradation in radar detection accuracy due to mounting of the radar antenna at the offset position apart from the car axis of the car can be prevented.

We claim:

1. A car on-board radar axis adjusting method for a car having a car on-board radar capable of detecting at least an azimuth angle between said car and a leading car, comprising the steps of:

setting at least two points on said car, drawing at least two isosceles triangles having a common base defined by a line connecting said setting points and sides of different lengths and determining a line connecting vertexes and its extension as a car axis;

mounting a radar antenna on said car at a position which is apart from said car axis by a distance and determining a straight line parallel to said car axis and passing through said position as an offset axis;

disposing a reflector in a direction at an azimuth angle as viewed from said position; and using said reflector as a detection target of said radar to adjust the mount angle of said radar antenna such that an azimuth angle detection value of said reflector detected by said radar equals a setting value of said azimuth angle.

2. A car on-board radar axis adjusting method according to claim 1, wherein the mount angle of said radar antenna is adjusted to announce detectability or non-detectability of said reflector or the detection value of azimuth angle of said reflector in the form of voice information or displayed visual information.

3. A car on-board radar axis adjusting method according to 1, wherein said reflector disposed ahead of said radar is a mobile radio wave reflector which can move over a predetermined distance through a predetermined angle with respect to a radio wave transmitting direction.

4. A car on-board radar axis adjusting method for a car having a car on-board radar capable of detecting at least an azimuth angle between said car and a leading car, comprising the steps of:

mounting a radar antenna either on a car axis of said car or at an offset position on said car which is apart from said car axis in the horizontal direction;

disposing a reflector along a boundary line of a maximum detectable area of said radar antenna and disposing radar reflectors at at least two locations on a boundary line of a desired detectable area; and adjusting the mount angle of said radar antenna such that said radar antenna can detect said radar reflectors.

5. A car on-board radar axis adjusting method for a car having a car on-board radar capable of detecting at least an azimuth angle between said car and a leading car, comprising the steps of:

mounting a radar antenna either on a car axis of said car or at an offset position on said car which is apart from said car axis in the horizontal direction;

disposing a reflector ahead of said car along a transmitting axis centered on the transmitting direction of said radar antenna;

setting an azimuth angle detection value of said reflector detected by said radar antenna as an initial azimuth angle; and making correction by using, as a true headway value, a result $\{X, Y\}^T$ obtained by converting coordinates of an apparent headway $\{X_o, Y_o\}^T$ detected by said radar antenna pursuant to the following Cartesian coordinates converting equation inclusive of the initial azimuth angle $\theta_0$:

$$\{X, Y\}^T = \begin{bmatrix} \cos(\theta_0 + \theta) & -\sin(\theta_0 + \theta) \\ \sin(\theta_0 + \theta) & \cos(\theta_0 + \theta) \end{bmatrix} \{X_0, Y_0\}^T.$$

6. A car on-board radar axis adjusting method for a car having a car on-board radar capable of detecting at least an azimuth angle between said car and a leading car, comprising the steps of:

mounting a radar antenna either on a car axis of said car or at an offset position on said car which is apart from said car axis in the horizontal direction;

mounting a temporarily mountable and light reflective reflector to the transmitting/receiving plane of said radar antenna; and irradiating light on said reflector and detecting reflection light by a light receiving detector to adjust the mount angle of said radar antenna such that the reflection light reaches within a desired positional area.

7. A car on-board radar axis adjusting method according to claim 6, wherein said light receiving detector is a photodiode detector.

* * * * *